(12) United States Patent
Azhar et al.

(10) Patent No.: US 11,315,286 B2
(45) Date of Patent: Apr. 26, 2022

(54) LOCATING A REGION OF INTEREST ON AN OBJECT

(71) Applicant: Hewlett-Packard Development Company, L.P., Spring, TX (US)

(72) Inventors: Faisal Azhar, Bristol (GB); Stephen Pollard, Bristol (GB); Guy Adams, Bristol (GB); Steven J. Simske, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/471,081

(22) PCT Filed: Apr. 26, 2017

(86) PCT No.: PCT/US2017/029673
§ 371 (c)(1),
(2) Date: Jun. 19, 2019

(87) PCT Pub. No.: WO2018/199946
PCT Pub. Date: Nov. 1, 2018

(65) Prior Publication Data
US 2020/0051277 A1     Feb. 13, 2020

(51) Int. Cl.
*G06K 9/00* (2022.01)
*G06T 7/73* (2017.01)
(Continued)

(52) U.S. Cl.
CPC .............. *G06T 7/75* (2017.01); *B29C 64/205* (2017.08); *B29C 64/386* (2017.08);
(Continued)

(58) Field of Classification Search
CPC .......... G06K 9/00201; G06K 9/00208; G06K 9/00577; G06K 9/2054; G06K 9/2063;
(Continued)

(56) References Cited

U.S. PATENT DOCUMENTS 5,822,450 A * 10/1998 Arakawa ............... G06T 7/0006
382/152
8,610,761 B2 * 12/2013 Haisty .................... H04N 13/30
348/51

(Continued)

FOREIGN PATENT DOCUMENTS

EP      2869240      5/2015
EP      3132919      2/2017

OTHER PUBLICATIONS

Karl D. D. Willis and Andrew D. Wilson, "InfraStructs: Fabricating Information Inside Physical Objects for Imaging in the Terahertz Region", ACM Transactions on Graphics, vol. 32, No. 4, Article 138, Jul. 2013, pp. 1-10 (Year: 2013).*

(Continued)

*Primary Examiner* — Eric Rush
(74) *Attorney, Agent, or Firm* — HP Inc. Patent Department (57) ABSTRACT

A method is disclosed. The method comprises defining a region of interest on a three-dimensional model of an object. The method may comprise capturing an image of an object manufactured according to the three-dimensional model. The method may comprise determining, using a processor, a position and orientation of the three-dimensional model with respect to the object in the captured image. The method may comprise locating the region of interest on the manufactured object. A portion of the manufactured object within the region of interest may comprise an identifiable feature. An apparatus and a machine-readable medium are also disclosed.

20 Claims, 4 Drawing Sheets

(51) Int. Cl.

| | |
|---|---|
| *B29C 64/393* | (2017.01) |
| *B29C 64/205* | (2017.01) |
| *G06K 9/32* | (2006.01) |
| *G06K 9/20* | (2006.01) |
| *B29C 64/386* | (2017.01) |
| *G06T 7/00* | (2017.01) |
| *B33Y 10/00* | (2015.01) |
| *B33Y 50/02* | (2015.01) |

(52) U.S. Cl.
CPC ........ *B29C 64/393* (2017.08); *G06K 9/00201* (2013.01); *G06K 9/00577* (2013.01); *G06K 9/2054* (2013.01); *G06K 9/2063* (2013.01); *G06K 9/3233* (2013.01); *G06T 7/001* (2013.01); *G06T 7/0004* (2013.01); *G06T 7/0006* (2013.01); *B33Y 10/00* (2014.12); *B33Y 50/02* (2014.12); *G06K 2009/0059* (2013.01)

(58) Field of Classification Search
CPC .. G06K 9/2072; G06K 9/2081; G06K 9/3216; G06K 9/3233; G06K 9/46; G06K 2009/0059; G06K 2009/3225; G06T 7/0004; G06T 7/0006; G06T 7/0008; G06T 7/001; G06T 7/60; G06T 7/70; G06T 7/73; G06T 7/74; G06T 7/75; G06T 2200/04; G06T 2207/30108; G06T 2207/30141; G06T 2207/30148; G06T 3/0006; G06T 3/0068; B29C 64/10; B29C 64/171; B29C 64/20; B29C 64/205; B29C 64/30; B29C 64/386; B29C 64/393; B33Y 10/00; B33Y 30/00; B33Y 50/00; B33Y 50/02; G05B 19/4097; G05B 19/4099; G05B 2219/49007; G05B 2219/49023; G05B 2219/40543
USPC ....... 382/100, 103, 141, 143–145, 147, 151, 382/152, 154, 181, 183, 190, 195, 199, 382/203, 282, 285–287, 291, 294; 345/419, 420, 427, 581, 619, 649–651, 345/653–655; 700/56–59, 95–98, 700/108–110, 115–125, 180–182, 186; 703/1
See application file for complete search history.

(56) References Cited

U.S. PATENT DOCUMENTS

| | | | |
|---|---|---|---|
| 8,848,201 B1* | 9/2014 | Bruce | G01B 11/24 356/601 |
| 9,291,565 B2 | 3/2016 | Hart et al. | |
| 9,892,558 B2* | 2/2018 | Troy | G06T 7/70 |
| 2003/0102661 A1* | 6/2003 | Camdessus | G09F 3/00 283/74 |
| 2007/0271053 A1* | 11/2007 | Palmateer | B64F 5/60 702/83 |
| 2008/0247635 A1* | 10/2008 | Davis | G06K 9/00 382/152 |
| 2009/0283583 A1* | 11/2009 | Cowburn | G06Q 10/087 235/375 |
| 2012/0243797 A1* | 9/2012 | Di Venuto Dayer | G06K 9/3208 382/218 |
| 2015/0117701 A1* | 4/2015 | Ross | G06K 9/6202 382/100 |
| 2015/0309502 A1 | 10/2015 | Breitgand et al. | |
| 2016/0221114 A1* | 8/2016 | Dietrich | G06K 9/00577 |
| 2016/0368220 A1 | 12/2016 | Dimatteo et al. | |
| 2016/0375676 A1* | 12/2016 | Ritchie | B29C 64/118 428/29 |
| 2017/0014195 A1 | 1/2017 | Daon et al. | |
| 2017/0026636 A1* | 1/2017 | Zahn | G06T 7/73 |
| 2017/0182710 A1* | 6/2017 | Haga | G06K 19/06046 |
| 2018/0293591 A1* | 10/2018 | Spears | B29C 64/386 |

OTHER PUBLICATIONS

Willis, K.D.D et al, Infrastructs: Fabricating Information Inside Physical Objects for Imaging in the Terahertz Region, ACM Transactions on Graphics, vol. 32, No. 4, Article 138, Jul. 2013.

Taylor, Phil, "Anti-counterfeit Tech Developed for 3d-printed objects", Jul. 1, 2014.

* cited by examiner

LOCATING A REGION OF INTEREST ON AN OBJECT

BACKGROUND

A three-dimensional object may be produced using a manufacturing process, such as an additive manufacturing process which involves generating the object on a layer-by-layer basis. Multiple three-dimensional objects may be generated to the same specification, such that the objects all appear substantially the same. It may be intended to identify each object, for example to determine the object's provenance.

BRIEF DESCRIPTION OF DRAWINGS

Examples will now be described, by way of non-limiting example, with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. Build material may be deposited, for example on a print bed and processed layer by layer, for example within a fabrication chamber. Other manufacturing techniques, including for example casting, injection moulding and machining, may also be used to generate three-dimensional objects.

Manufacturing systems, such as additive manufacturing systems, may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Design data may be used by a manufacturing apparatus to generate multiple three-dimensional objects all according to the same specification. It may be intended that each object is identifiable, such that it is possible to determine whether a particular object is one which was generated using a particular manufacturing apparatus, or whether the object is a counterfeit article.

Figure 1:
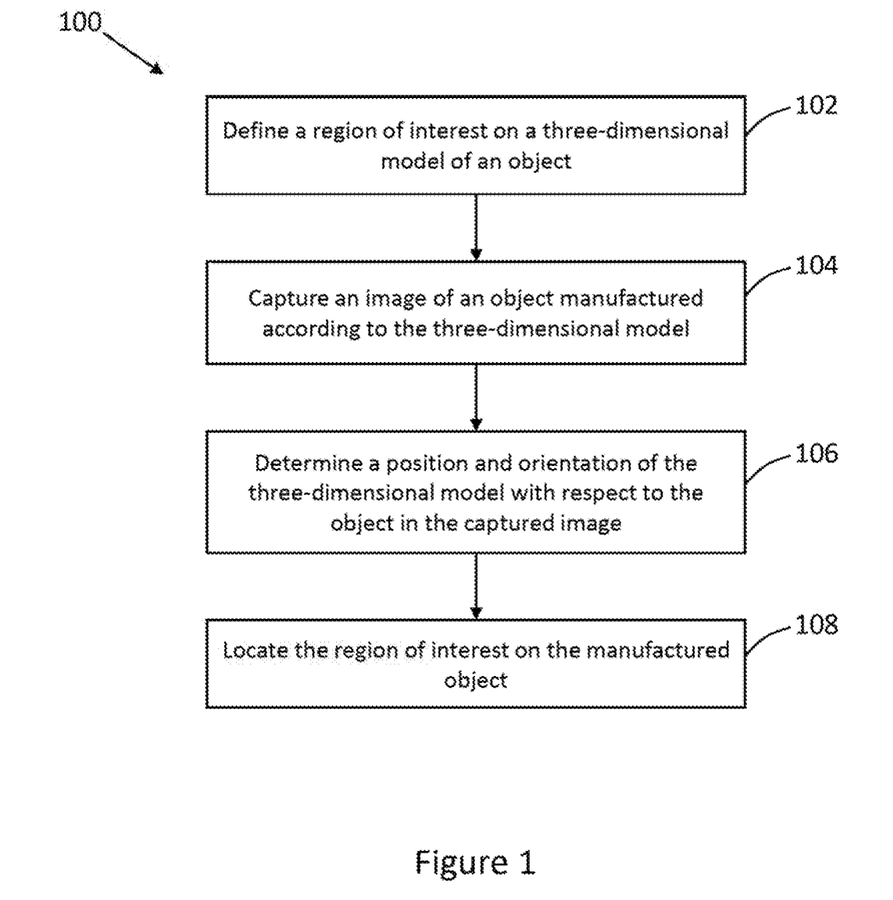
FIG. 1 is a flowchart of an example of a method of locating a region of interest on an object.

Referring to the drawings, FIG. 1 is a flowchart of an example of a method 100 for locating a region of interest on an object. The method 100 comprises, at block 102, defining a region of interest on a three-dimensional model of an object. The three-dimensional model may be a model of an object to be generated using manufacturing process, such as an additive manufacturing apparatus. In some examples, the three-dimensional model may comprise a computer-aided design (CAD) model or a three-dimensional scanned model. For example, a region of interest may be defined on a CAD model of the object to be generated. In other examples, an object (such as an object upon which a manufactured object is to be based, or an object which has been generated using the manufacturing apparatus) may be scanned, using a scanner. For example, a three-dimensional scan of the object may be obtained. In some examples, a three-dimensional scan of the object may be obtained using a structured light scanner.

A three-dimensional object may be represented in terms of a set of vertices, edges and faces. In some examples, the location of the region of interest may be defined in terms of a fixed location relative to the vertices, the edges and/or the faces. In other examples, the location of the region of interest may be represented as a six degree of freedom (DoF) relative location and orientation of a coordinate frame with respect to the frame of reference of the three-dimensional model (e.g. a CAD model).

The region of interest may be a portion of the object which is to be used as an identifier for the object. In other words, the region of interest may be an area or volume which may include an identifiable aspect or feature and which may be used at some later time to identify the object. In some examples, the identifiable feature may comprise a physical structure, feature or characteristic of the object itself. For example, a particular characteristic of the build material used to generate the three-dimensional object within the region of interest may be measured and noted. In other examples, the identifiable feature may comprise a surface property (e.g. a light scattering measurement), a shape of a portion of the surface, a surface texture, a colour measurement, a chemical composition or an absorption spectrum measurement from a portion of the object within the region of interest. In some examples, the identifiable feature may comprise a mark created in or on the object, such as a barcode, a QR code, a chemical taggant, an embedded identifier or quantum dots. A quantity measured at the region of interest of an object may be measured at a later date and compared against the previous measurement to confirm whether or not the object is the same object. In this way, the region of interest may be considered to be a fiducial, and may be considered to include a physical identifying feature. In some examples, the fiducial may be considered to be 'virtual' as the region of interest of the object may appear to be identical to adjacent regions of the object. The identifiable feature may be a property of the object itself. The identifiable feature may be considered to be a fingerprint of the object. The fingerprint may be checked (e.g. extracted and compared with a corresponding fingerprint stored in a database or the cloud) to confirm its identity.

The method 100 may comprise, at block 104, capturing an image of an object manufactured according to the three-dimensional model. As noted above, an object may be manufactured or generated using an additive manufacturing process, and the three-dimensional model may be used as an input on which the manufacture is based. In some examples, the captured image may comprise a three-dimensional representation. For example, the image may include depth and/or colour information.

At block 106, the method 100 may comprise determining, using a processor, a position and orientation of the three-dimensional model with respect to the object in the captured image. Determining the position and orientation may comprise registering, or aligning, the three-dimensional model with the captured image. By determining the position and orientation of the model with respect to the object in the image, it may be possible to determine which part of the three-dimensional model of the object corresponds with the portion of the object in the captured image. In some examples, determining the position and orientation may be achieved by determining a transformation (e.g. a rigid transformation) which aligns the three-dimensional model to the captured image. The transformation may be applied to the defined location of the region of interest on the model. The location of the region of interest relative to the portion of the object captured in the image may then be determined.

In some examples, the determination made at block 106 may enable the location of the region of interest to be determined with respect to the captured image of the object. Once the orientation and position of the three-dimensional model have been determined with respect to the captured image, any point or region which has been defined in the three-dimensional model may be located relative to the captured image of the object. Thus, it is possible to determine the location of the defined region of interest with respect to the captured image. For example, the processor may be able to determine which part of the model corresponds with the portion of the object shown in the captured image and, therefore, the processor may determine where the region of interest is relative to the portion of the object shown in the captured image.

At block 108, the method 100 may comprise locating the region of interest on the manufactured object. For example, the location of the region of interest may be determined based on the determination made at block 106. Since the position of the region of interest has been defined with respect to the model of the three-dimensional object, and the position and orientation of the three-dimensional model with respect to the object in the captured image can be determined, it is possible to determine the location of the region of interest on the manufactured model itself. As indicated above, a portion of the manufactured object within the region of interest may comprise an identifiable feature. Thus, the identifiable feature within the region of interest may be located and inspected in order to determine the origin, or provenance, of the manufactured object. In this way, it may be possible to determine whether the manufactured object is a genuine article, manufactured at an intended source. Similarly, it may be possible to determine whether the manufactured object is a counterfeit article, as the object will not have a valid identifiable feature within the region of interest.

Since a feature of the manufactured object itself may be used as the identifiable feature, time and cost savings may be made by not applying an additional identifiable mark to the object. Since no physical mark may be made on the object, the aesthetics and the structural integrity of the object may be maintained. Furthermore, since there is no distinguishing mark on the object identifying the region of interest, copying or replicating the identifiable feature is extremely difficult.

Figure 2:
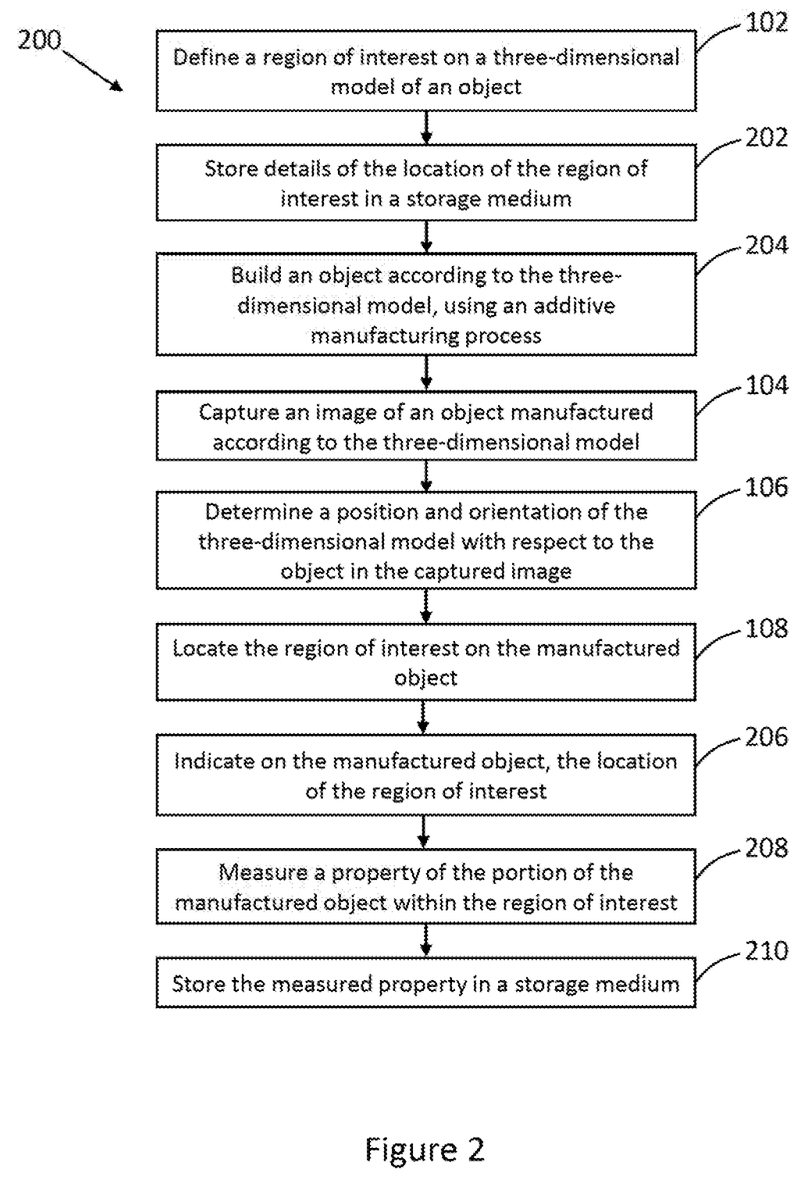
FIG. 2 is a flowchart of a further example of a method of locating a region of interest on an object.

FIG. 2 is a flowchart of a further example of a method 200 for locating a region of interest on an object. The method 200 may include blocks of the method 100 discussed above, and may further include a block, or multiple blocks, shown in FIG. 2. At block 202, the method 200 may comprise storing details of the location of the region of interest in a storage medium. The details may be stored after the region of interest has been defined, in block 102. The storage medium may be a storage medium associated with a computing system and/or with a manufacturing apparatus used to manufacture the object. In some examples, the details of the location of the region of interest may be stored as part of, or associated with, a computer file including the three-dimensional model of the object. For example, details of the location of the region of interest may be stored as an integral part of the model description (e.g. the CAD model description) of the object. The details may be stored in a database or look-up table and may be associated, for example, with a reference or code identifying the manufactured object. In some examples, the manufactured object may comprise a component part of an object. In such examples, the details of the location of the region of interest may be stored along with a unique part number, code or reference identifying the particular object. In some examples, details of the location of the region of interest may be printed onto, stuck onto or otherwise marked on the object, for example in the form of a two-dimensional barcode, a QR code, an RFID code, or some other machine-readable mark.

The method 200 may comprise, at block 204, building an object according to the three-dimensional model, using an additive manufacturing process. The additive manufacturing process may be performed, for example, by an additive manufacturing apparatus using build material. In some examples, an image of the object may be captured soon after manufacture, and may be included as part of the manufacturing process. As such, the location of the region of interest may be determined on the manufactured object (e.g. using the method 100) soon after manufacture, without adding further processes (requiring additional time and cost expenditure) at a later time. In some examples, the object may be built using a different manufacturing process.

After the region of interest has been located on the manufactured object (block 108), the region of interest may be inspected or analysed in order to extract the identifiable feature of the object.

The method 200 may comprise, at block 206, indicating, on the manufactured object, the location of the region of interest. For example, the region of interest may be projected onto the object using a light, such as a laser light. In some examples, the location may be indicated using a projector. The indication of the region of interest may be made so that a user can examine the object at the region of interest, and extract information indicative of the identity of the object. In other examples, the location of the region of interest may be presented on a display, such as a computer display. For example, the location of the region of interest may be indicated on a representation of the object, for example on the three-dimensional model of the object or on an image or video stream of the object, on a computer display. In this way, a user viewing the display may be able to determine the location of the region of interest without any indication being made on the object itself.

Thus, the method 200 may comprise, at block 208, measuring a property of the portion of the manufactured object within the region of interest. As indicated above, the property may comprise a property of the build material used to generate the object, a property of the surface of the object, or another property which allows the object to be identified and distinguished from other objects manufactured according to the same three-dimensional model. In some examples, the identifiable feature may be unique to the particular object on which it is located. In other examples, the identifiable feature may not be unique, but may be almost unique.

The property may be measured (block 208) using a device operated, for example, by a user. In some examples, the property may be measured by a machine (e.g. a robotic machine). Once the region of interest has been located, the machine may measure a particular property at the region of interest.

In some examples, the object may be oriented or positioned such that the region of interest is not accessible. For example, the region of interest may be positioned on a bottom surface of the object. If it is determined that the region of interest is in a position such that a property cannot be measured (block 208), then action may be taken. In some examples, the object may be reoriented, for example by a robotic arm. In other examples, an indication may be made to a user that the measurement cannot be made. A user may, in some examples, be requested to reorient the object. For example, a message may be displayed to a user on a display. In some examples, the user may be instructed how to reorient the object.

At block 210, the method 200 may comprise storing the measured property in a storage medium. The storage medium may be associated with a computing system and/or with an additive manufacturing apparatus used to manufacture the object. In some examples, the details of the location of the region of interest may be stored as part of, or associated with, a computer file including the three-dimensional model of the object. The measured property may, in some examples, be stored in the storage medium in which the details of the location of the region of interest are stored (at block 202). The measured property may be associated with details of the location of the region of interest. In some examples, the measured property may be stored or associated with an additional object identifier, such as a code, reference number or serial number. In this way, the relevant information may be recalled from the storage medium at a later time if it is intended to check whether measured property of an object corresponds to the stored property.

According to the method described herein, when an object is generated according to a three-dimensional model, the defined region of interest may be located on the object, and a property (e.g. an identifying feature) may be measured at the region of interest. Details of the measured property of the object may be logged, for example, by storing the details in a database. At a later time, it may be intended to check whether a particular manufactured object is one which has been logged. To do this, the region of interest may be located, for example using the method disclosed herein, and the same property may be measured at the region of interest. If the measured property corresponds with (e.g. is the same as) the property stored in the database, then it may be confirmed that the object is one which has been logged, and is, therefore, genuine. If the measured property does not correspond with one in the database, then it may be determined that the object has not been logged, and may not be genuine (e.g. it may be counterfeit).

Figure 3:
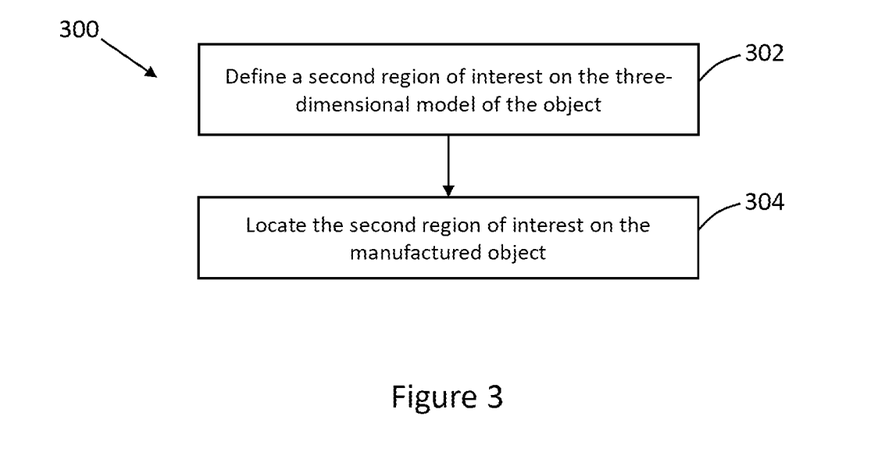
FIG. 3 is a flowchart of a further example of a method of locating a region of interest on an object.

FIG. 3 is a flowchart of a further example of a method 300 for locating a region of interest on an object. The method 300 may include a block or multiple blocks of the methods 100, 200 discussed above, and may further include blocks shown in FIG. 3. The method 300 may comprise, at block 302, defining a second region of interest on the three-dimensional model of the object. The region of interest defined at block 102 may therefore comprise a first region of interest. In other words, multiple regions of interest may be defined for a three-dimensional model. Thus, in addition to defining the region of interest at block 102, a second region of interest may be defined in the same model. In some examples, additional regions of interest may be defined.

By determining the position and orientation of the three-dimensional model with respect to the object in the captured image (block 106), is it possible to locate the second region of interest with respect to the captured image of the object. The image captured at block 104 may be sufficient for locating the second region of interest. In some examples, the second region of interest may be located when the region of interest (i.e. a first region of interest) is located.

The method 300 may comprise, at block 304, locating the second region of interest on the manufactured object. Locating the second region of interest may be performed in the same way as the locating of the first region of interest at block 108. As with the region of interest discussed above with reference to FIG. 1 (i.e. the first region of interest), a portion of the manufactured object within the second region of interest may comprise an identifiable feature. By identifying multiple regions of interest, each having an identifiable feature, if a portion of an object containing a region of interest is damaged, or inaccessible, then an identifiable feature may be measured at a different region of interest. Thus, the method 300 may further comprise measuring a property of the portion of the manufactured object within the second region of interest. The measured property may be stored in a storage medium, such as the storage medium in which the measured property obtained at block 206 is stored. Including multiple identifiable features located at multiple regions of interest may provide improved robustness to wear/damage, and tolerance to counterfeiting.

In some examples, an attempt to measure a property at the first region of interest may be made. If it determined, for any reason, that a measurement cannot be made at the first region of interest, or if the property cannot be measured at the first region of interest, an attempt may be made to measure the property at the second region of interest.

As noted above, the manufactured object may, in some examples comprise a part of a larger object. For example, multiple parts may be connected or attached together to form a larger object. In some examples, a region of interest may be defined (block 102) such that the region of interest is in a location which is accessible after manufacture, and after the object has been assembled or attached to other objects as intended. In this way, it may still be possible to examine the region of interest and measure the property at the region of interest (so as to extract the identifiable feature) even after the object has been assembled or attached to other objects. In other examples, the region of interest may be located on the manufactured object in a position which, when the object is assembled or attached to other objects, is not accessible (i.e. the region of interest cannot be examined). In such examples, the object may be disassembled to reveal the region of interest and, therefore, the identifiable feature. This may be used to protect the region of interest, for example to reduce the risk of damage to the region of interest.

As noted above, in some examples, the region of interest may be located such that it cannot be accessed and, therefore, a user, device or robot is unable to examine the region of interest to examine the identifying feature of the object. Such a scenario might occur, for example, if it is determined that the region of interest is too far away from the entity performing the examination, or if it is fully obstructed from access. In some examples, it might be determined that the region of interest is partially occluded (e.g. part of the region of interest may be accessible), or partially damaged. In such cases, it may be possible to examine part of the information at the region of interest (e.g. obtain some identifying information) which may be sufficient to establish that the located region of interest is likely to be the correct region of interest, but not sufficient to provide an intended statistical confidence in the identifying information.

Figure 4:
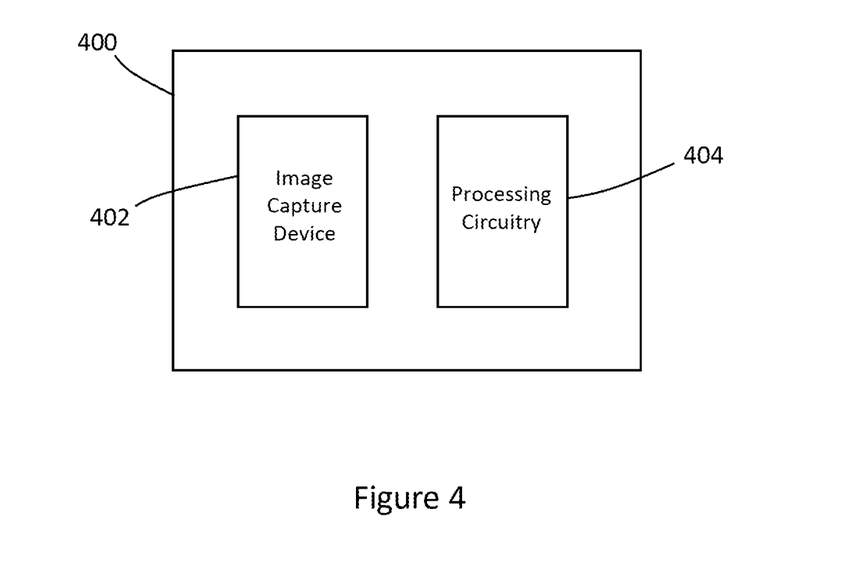
FIG. 4 is a simplified schematic of an example of apparatus for locating a region of interest on an object.

According to some examples, an apparatus may be controlled to perform the methods 100, 200, and 300 discussed above. FIG. 4 is a simplified schematic of an example of an apparatus 400 for locating a region of interest on an object. The apparatus 400 may comprise an image capture device 402 and processing circuitry 404. The image capture device 402 is to capture an image of an object manufactured according to a three-dimensional model. The captured image may comprise a three-dimensional representation of the object, or a portion of the object. The processing circuitry 404 may define a region of interest on a three-dimensional model of the object. In some examples, the processing circuitry 404 may define multiple regions of interest on the model. The processing circuitry 404 may determine a position and orientation of the three-dimensional model with respect to the object in the captured image. The processing circuitry 404 may locate the region of interest on the manufactured object. A portion of the manufactured object within the region of interest may comprise an identifiable feature. In some examples, the processing circuitry 404 may locate the region of interest on the captured image.

The processing circuitry 404 may comprise circuitry within a computing device, which may for part of, or be associated with, an additive manufacturing apparatus. In some examples, the processing circuitry may be remote from the image capture device 402, such that processing tasks may be performed, for example, by a server of at a remote computing device.

Figure 5:
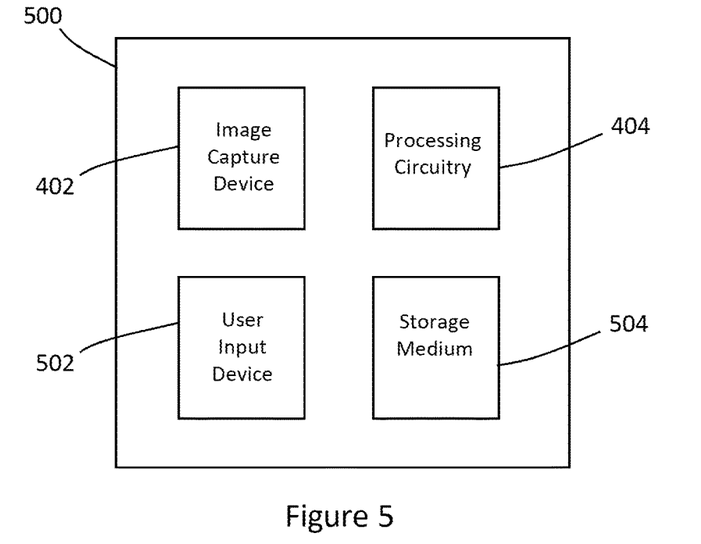
FIG. 5 is a simplified schematic of a further example of apparatus for locating a region of interest on an object.

FIG. 5 is a simplified schematic of an example of an apparatus 500 for locating a region of interest on an object. The apparatus 500 may comprise the image capture device 402 and the processing circuitry 404. In some examples, the apparatus 500 may further comprise a user input device 502 to enable a user to define the region of interest on the three-dimensional model of the object. The user input device 502 may, for example, comprise a keyboard, a mouse, a touchpad or a touchscreen. A user may use the user input device 502 to manipulate the three-dimensional model of the object and select a portion of the model to be used as the region of interest. In some examples, the region of interest may not be defined by a user. Instead, the region of interest may be defined as part of a design process, for example as an automated task performed by a processor, when the model of the three-dimensional object is generated.

The apparatus 500 may, in some examples, comprise a storage medium 504 to store details of the location of the region of interest. As noted above, the storage medium 504 may include a database or look-up table within which details of the location of the region of interest may be recorded.

Figure 6:
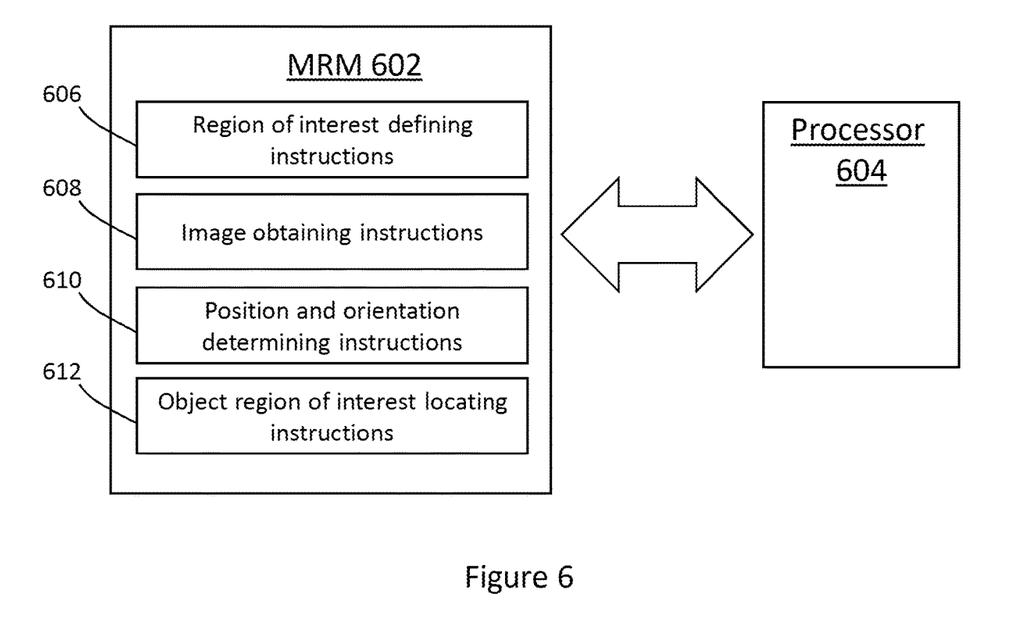
FIG. 6 is a schematic of an example machine-readable medium with a processor.

FIG. 6 is a schematic of an example machine-readable medium 602 with a processor 604. The machine-readable medium 602 may comprise instructions which, when executed by a processor 604, cause the processor to perform the methods 100, 200 and/or 300 discussed above. The machine-readable medium 602 may comprise instructions which, when executed by a processor 604, cause the processor to define a region of interest on a three-dimensional model of an object. The machine-readable medium 602 may comprise region of interest defining instruction 606 to perform the defining. The machine-readable medium 602 may comprise instructions which, when executed by a processor 604, cause the processor to obtain an image of a portion of the object including the region of interest. The machine-readable instructions may comprise image obtaining instructions 608 to obtain the image. The machine-readable medium 602 may comprise instructions which, when executed by a processor 604, cause the processor to determine a position and orientation of the three-dimensional model with respect to the object in the captured image. The machine-readable medium 602 may comprise position and orientation determining instructions 610 to determine the position and orientation. The machine-readable medium 602 may comprise instructions which, when executed by a processor 604, cause the processor to locate the region of interest on an object manufactured according to the three-dimensional model. The machine-readable medium 602 may comprise object region of interest locating instructions 612 to locate the region on the object. A portion of the manufactured object within the region of interest may comprise an identifiable feature.

In some examples, the machine-readable medium 602 may comprise instructions which, when executed by a processor 604, cause the processor to locate the region of interest with respect to the image of the object. The machine-readable medium 602 may comprise image region of interest locating instructions to locate the region with respect to the image.

In some examples, the machine-readable medium 602 may comprise instructions which, when executed by a processor 604, cause the processor to measure a property of the manufactured object at the region of interest. The property may, in some examples, be measured by a device associated with the machine-readable medium 602 and the processor 604, and controlled by the processor.

The machine-readable medium 602 may, in some examples, comprise instructions which, when executed by a processor 604, cause the processor to store details of the location of the region of interest in a storage medium. The storage medium may comprise a memory unit. In some examples, the storage medium may comprise, or be similar to, the storage medium 504 discussed above with reference to FIG. 5.

Examples in the present disclosure can be provided as methods, systems or machine readable instructions, such as any combination of computer programme code, hardware, or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, at a system comprising a hardware processor, information comprising a location of a region of interest on a three-dimensional model of an object;
   capturing, using the system, an image of a manufactured object manufactured according to the three-dimensional model, wherein a portion of the manufactured object within the region of interest comprises an identifiable feature on a surface of the manufactured object;
   determining, using the system, a position and an orientation of the three-dimensional model with respect to the manufactured object in the captured image, wherein the determining of the position and the orientation of the three-dimensional model with respect to the manufactured object in the captured image comprises aligning the three-dimensional model with the captured image;
   determining, using the information and the determined position and the orientation of the three-dimensional model with respect to the manufactured object in the captured image, the location of the region of interest with respect to the captured image; and
   using the system and based on the determining of the location of the region of interest with respect to the captured image, visually indicating, on the manufactured object, the location of the region of interest on the manufactured object, for identifying the identifiable feature on the surface of the manufactured object so that the identifiable feature is visible to a user.

2. The method of claim 1, further comprising:
   building the manufactured object according to the three-dimensional model, using an additive manufacturing process.

3. The method of claim 1, wherein visually indicating the location of the region of interest on the manufactured object comprises projecting light onto the location of the region of interest on the manufactured object.

4. The method of claim 1, further comprising:
   measuring a property of the portion of the manufactured object within the region of interest.

5. The method of claim 1, wherein the identifiable feature on the surface of the manufactured object comprises a visible mark placed on the surface of the manufactured object.

6. The method of claim 1, wherein the three-dimensional model comprises one of a computer-aided design (CAD) model and a three-dimensional scanned model.

7. The method of claim 1, wherein the captured image comprises a three-dimensional representation.

8. The method of claim 1, further comprising:
   receiving further information of a second region of interest on the three-dimensional model of the object; and
   locating the second region of interest on the manufactured object,
   wherein a portion of the manufactured object within the second region of interest comprises an identifiable feature.

9. The method of claim 1, wherein the identifiable feature is a property of the manufactured object itself that is provided on the manufactured object without applying an identifiable mark to the manufactured object.

10. The method of claim 9, wherein the identifiable feature includes a color of the manufactured object.

11. The method of claim 9, wherein the identifiable feature includes a surface texture of the manufactured object.

12. The method of claim 1, further comprising:
    controlling a robotic arm using the system to reorient the manufactured object based on the determining of the location of the region of interest with respect to the captured image.

13. An apparatus comprising:
    a processor; and
    a non-transitory storage medium storing instructions executable on the processor to:
      receive an image of a manufactured object manufactured according to a three-dimensional model;
      receive information of a first location of a first region of interest on the three-dimensional model, and information of a second location of a second region of interest on the three-dimensional model, wherein a portion of the manufactured object within the first region of interest comprises an identifiable feature on a surface of the manufactured object, and a portion of the manufactured object within the second region of interest comprises the identifiable feature on the surface of the manufactured object;
      determine a position and an orientation of the three-dimensional model with respect to the manufactured object in the image, wherein the determining of the position and the orientation of the three-dimensional model with respect to the manufactured object in the image comprises aligning the three-dimensional model with the image;

locate the first region of interest on the manufactured object using the information of the first location of the first region of interest and the determined position and the orientation of the three-dimensional model with respect to the manufactured object in the image;

based on the locating of the first region of interest, visually indicate, on the manufactured object, the first location of the first region of interest on the manufactured object to make visible the identifiable feature on the surface of the manufactured object;

attempt to identify the identifiable feature in the first region of interest on the surface of the manufactured object; and in response to being unable to identify the identifiable feature in the first region of interest on the surface of the manufactured object:

locate the second region of interest on the manufactured object, and identify the identifiable feature in the second region of interest on the surface of the manufactured object.

14. The apparatus of claim 13, wherein the instructions are executable on the processor to receive a user input defining the first region of interest and the second region of interest on the three-dimensional model.

15. The apparatus of claim 13, wherein the instructions are executable on the processor to control a robotic arm to reorient the manufactured object based on locating the first region of interest on the manufactured object.

16. A non-transitory machine-readable medium comprising instructions that when executed on a processor cause a system to:

receive information comprising a location of a region of interest on a three-dimensional model of an object;

obtain an image of a manufactured object manufactured according to the three-dimensional model, wherein a portion of the manufactured object within the region of interest comprises an identifiable feature on a surface of the manufactured object;

determine a position and an orientation of the three-dimensional model with respect to the manufactured object in the obtained image, wherein the determining of the position and the orientation of the three-dimensional model with respect to the manufactured object in the obtained image comprises aligning the three-dimensional model with the obtained image;

determine, using the information and the determined position and the orientation of the three-dimensional model with respect to the manufactured object in the obtained image, the location of the region of interest with respect to the obtained image; and based on the determining of the location of the region of interest with respect to the obtained image, visually indicate, on the manufactured object, the location of the region of interest on the manufactured object, for identifying the identifiable feature on the surface of the manufactured object so that the identifiable feature is visible to a user.

17. The non-transitory machine-readable medium of claim 16, wherein the instructions when executed cause the system to:

receive a measurement of a property of the manufactured object at the region of interest.

18. The non-transitory machine-readable medium of claim 16, wherein visually indicating the location of the region of interest on the manufactured object comprises causing a projection of light onto the location of the region of interest on the manufactured object.

19. The non-transitory machine-readable medium of claim 16, wherein the identifiable feature is a property of the manufactured object itself that is provided on the manufactured object without applying an identifiable mark to the manufactured object.

20. The non-transitory machine-readable medium of claim 19, wherein the identifiable feature includes a color of the manufactured object.

* * * * *